(12) United States Patent
Larsen et al.

(10) Patent No.: US 6,473,617 B1
(45) Date of Patent: Oct. 29, 2002

(54) ENHANCED CELLULAR COMMUNICATION SYSTEM

(75) Inventors: James David Larsen, Pretoria (ZA); Mark Sievert Larsen, Pretoria (ZA)

(73) Assignee: Salbu Research and Development (Proprietary) Limited of Pretoria (ZA)

( * ) Notice: Subject to any disclaimer, the term of this patent is extended or adjusted under 35 U.S.C. 154(b) by 0 days.

(21) Appl. No.: 09/381,040

(22) PCT Filed: Mar. 3, 1998

(86) PCT No.: PCT/GB98/00661

§ 371 (c)(1),
(2), (4) Date: Oct. 12, 1999

(87) PCT Pub. No.: WO98/39936

PCT Pub. Date: Sep. 11, 1998

(30) Foreign Application Priority Data

Mar. 3, 1997 (ZA) ................................................ 97/1819

(51) Int. Cl.[7] ................................................. H04Q 7/20
(52) U.S. Cl. ...................... 455/446; 455/422; 455/11.1; 455/524; 455/63
(58) Field of Search ................................ 455/446, 447, 455/448, 449, 522, 524, 525, 63, 561, 562, 11.1, 422, 442, 436, 443, 13.1, 500, 501, 67.3; 370/328, 338

(56) References Cited

U.S. PATENT DOCUMENTS

| | | | |
|---|---|---|---|
| 4,790,000 A | * 12/1988 | Kinoshita | 379/59 |
| 5,481,539 A | 1/1996 | Hershey et al. | 370/85 |
| 5,579,373 A | * 11/1996 | Jang | 379/59 |
| 5,722,051 A | * 2/1998 | Agrawal et al. | 455/69 |
| 5,752,197 A | * 5/1998 | Rautiola | 455/522 |
| 5,937,019 A | * 8/1999 | Padovani | 375/358 |
| 6,005,884 A | * 12/1999 | Cook et al. | 375/202 |

FOREIGN PATENT DOCUMENTS

| | | |
|---|---|---|
| EP | 0689303 | 5/1994 |
| GB | 2291564 | 1/1996 |

* cited by examiner

Primary Examiner—Edward F. Urban
Assistant Examiner—Temica M. Davis
(74) Attorney, Agent, or Firm—Ladas & Parry (57) ABSTRACT

A cellular network comprises a plurality of mobile stations and a plurality of base stations. The base stations are located so that each base station has a zone of effective coverage which does not overlap with the zones of effective coverage of adjacent base stations leaving zones of reduced coverage between the base stations. When a sender station which is outside the zone of effective coverage of a particular base station wishes to send a message to that base station, the message is relayed by another mobile station to the destination base station. The relaying station may be located within the zone of effective coverage, or in the zone of reduced coverage of the destination base station. The sender station, the destination station and the relaying station(s) can all be mobile stations located in zones of reduced coverage. In the zones of reduced coverage, resources such as transmission power, transmission time-slots and frequency channels are utilized on a reduced basis, effectively sharing the resources between the stations.

21 Claims, 7 Drawing Sheets

```
Time Slot 1
6 -> 5      4      a
1     2 -> 3      a
9     8      7 -> a
```

FIG. 7b

```
Time Slot 2
6      5 -> 4      a
1      2     3 -> a
9 -> 8      7      a
```

FIG. 7c

```
Time Slot 3
6      5      4 -> a
1 -> 2      3      a
9      8 -> 7      a
```

ENHANCED CELLULAR COMMUNICATION SYSTEM

BACKGROUND OF THE INVENTION

THIS invention relates to a method of transmitting data between stations in a cellular wireless communication system, and to a system which employs the method.

Conventional cellular wireless communication systems comprise a plurality of base stations each of which defines a cell of coverage. Mobile stations can communicate with a base station provided that they are within the relevant cell. In order to provide complete coverage of a predetermined geographical area, the location of base stations is selected so that the cells overlap, to minimize or eliminate "dead" areas.

The above arrangement has the effect that each cell has a central, interference free zone, and an outer zone which overlaps with outer zones of one or more adjacent cells, in which interference can take place. In these latter areas, a mobile station transmitting to one base station will produce interference at the base stations of adjacent cells. In addition, in the overlapping zones, transmissions from adjacent base stations to mobile stations will interfere with each other.

This interference results in a reduction in capacity since base stations have to share resources (time slots, frequency channels or spreading code, for example) between themselves in communicating with other stations in the outer, overlapping zones.

In order to deal with this problem, conventional cellular networks are arranged so that adjacent base stations transmit using different resources (e.g. different frequencies and/or different time slots) to avoid interference. In a multi-cell network, this requires a high level of time synchronisation between the various base stations.

Since given resources cannot be used by adjacent base stations simultaneously, there is a reduction in the capacity provided by these base stations measured in erlangs/cell/Hz, for example. In addition, stations transmitting from outer zones have to use higher power to reach the base stations, which tends to result in reduced mobile station battery life and more expensive mobile stations.

SUMMARY OF THE INVENTION

According to the invention there is provided a method of transmitting data between stations in a cellular wireless communication system comprising a plurality of mobile stations and a plurality of base stations, the method comprising locating a plurality of base stations so that each base station has a zone of effective coverage which does not overlap with the zones of effective coverage of adjacent base stations, thereby defining zones of reduced coverage between the base stations, and relaying a data message from a sender station which is outside the zone of effective coverage of a destination base station to said destination base station via at least one mobile station.

The destination station may be a base station and the sender station may be a mobile station, in which case said at least one relay station may be located within the zone of effective coverage of the destination base station.

The data message from the sender station may instead or in addition be relayed by at least one relay station located in a zone of reduced coverage with respect to said destination base station.

The destination station, the sender station and said at least one relay station may all be mobile stations.

The zones of reduced coverage with respect to each base station are preferably zones in which at least one resource utilized by the base station is reduced.

The resources may include transmission power, transmission time slots, frequency channels, modulation efficiency and codes.

The resources are preferably reduced due to sharing thereof between two or more base stations in respective overlapping zones of reduced coverage of the base stations.

The relay stations may adjust their transmission power, when relaying messages to a base station or a mobile station in the zone of effective coverage of a base station, to avoid interference with said base station.

The relay stations may further adjust their usage of at least one of their transmission time slots, frequency channels, modulation efficiency and codes to avoid interference with said base station.

The relay stations may monitor data transmissions to and from base stations and/or between other mobile stations, and relay messages opportunistically when said data transmissions are not occurring, thereby sharing resources with other stations.

The relay stations may monitor data transmissions to and from base stations and/or between other mobile stations, and relay messages at a sufficiently low power level to avoid interference with said data transmissions.

The relay stations may monitor data transmissions to and from base stations and/or between other mobile stations and relay messages opportunistically, utilising higher efficiency modulation, when an increased signal to interference ratio is available, to avoid interference with said data transmissions.

Further according to the invention there is provided a cellular wireless communication system comprising a plurality of mobile stations and a plurality of base stations, each station being able to transmit data to and receive data from other stations, the base stations being located so that each base station has a zone of effective coverage which does not overlap with the zones of effective coverage of adjacent base stations, thereby defining zones of reduced coverage between adjacent base stations, and the mobile stations being adapted to relay data messages received from a sender station which is outside the zone of effective coverage of a destination base station to said destination base station.

Preferably, the zones of reduced coverage with respect to each base station are zones in which at least one resource utilized by each base station is reduced.

The resources may be, for example, transmission power, transmission time slots, frequency channels, modulation efficiency, or codes.

The resources may be reduced due to sharing thereof between two or more base stations in respective overlapping zones of reduced coverage of the base stations.

The mobile stations are preferably adapted to adjust their transmission power, when relaying messages to a base station or a mobile station in the zone of effective coverage of a base station, to avoid interference with said base station.

The mobile stations may further be adapted to adjust their usage of at least one of their transmission time slots, frequency channels, modulation efficiency and codes to avoid interference with said base station.

The mobile stations are preferably adapted to monitor data transmissions to and from base stations and/or between other mobile stations, and to relay messages opportunistically when said data transmissions are not occurring, or at a sufficiently low power level to avoid interference therewith, thereby to share resources with other stations.

The mobile stations may be adapted to monitor data transmissions to and from base stations and/or between other mobile stations and to relay messages opportunistically, utilising higher efficiency modulation, when an increased signal to interference ratio is available, to avoid interference with said data transmissions.

BRIEF DESCRIPTION OF THE DRAWINGS

The invention will now be described in more detail, by way of example only, with reference to the accompanying drawings in which.

DESCRIPTION OF EMBODIMENTS

In the present invention, a cellular network is provided which comprises a plurality of base stations (which will usually, but not necessarily, be fixed) which define cells with non-overlapping zones of effective coverage, so that there are no zones of interference between the various base stations. The zones of effective coverage (or cell site) can be fixed in size or can be varied dynamically. This allows for full utilization of the resources available to each base station (such as transmission power, transmission time slots, frequency channels, or codes), without regard to the transmissions of other base stations. This effectively increases the capacity of each base station.

The obvious result of this arrangement is that there are "holes" or "dead" zones between the base stations where there is no effective coverage, i.e. zones of reduced coverage within which only limited resources are available to stations (typically mobile stations) in those zones wanting to communicate with other stations. In a conventional cellular communication system, mobile stations or handsets would normally be unusable (or would have limited resources available to them) in these dead zones. However, by utilizing mobile stations which are able to relay messages from other mobile stations into the relevant cells, complete coverage can be obtained, for all available resources, provided that there are sufficient mobile stations present. If there are insufficient mobile stations available there will not be a high resource requirement and the limited resources available will provide sufficient capacity. Therefore the network is self scaling in that the more mobile stations there are in a cell, the more capacity will be available due to more efficient use of the resources at the base stations.

Suitable mobile stations (transceivers) are described in PCT Patent Application No. WO 96/19887, the contents of which are incorporated herein by reference.

The mobile transceivers described in the above mentioned patent application operate by transmitting data messages opportunistically between themselves and other stations in order to relay messages from an originating station to a destination station. Such transceivers can be used to advantage in a cellular communication system organized as described above, where they effectively fill in the gaps in the coverage between adjacent cells, while allowing the organization of the cellular network itself to be simplified. At the same time, the network capacity is maximized and the transmission power of the mobile transceivers is minimized.

Figure 1:
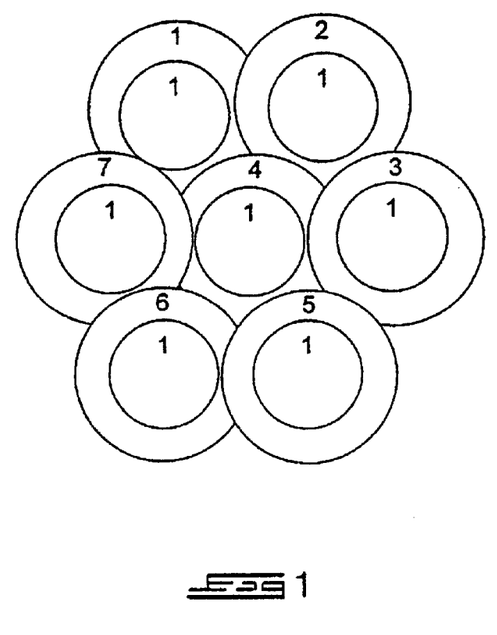
FIG. 1 is a simplified schematic diagram showing the coverage of cells in a conventional cellular network.

FIG. 1 shows in a very simplified manner the overlapping of cellular coverage in a conventional cellular network, where each of the seven illustrated cells has an inner interference-free zone and an outer zone which overlaps with one or more adjacent cells and which is subject to interference.

Figure 2:
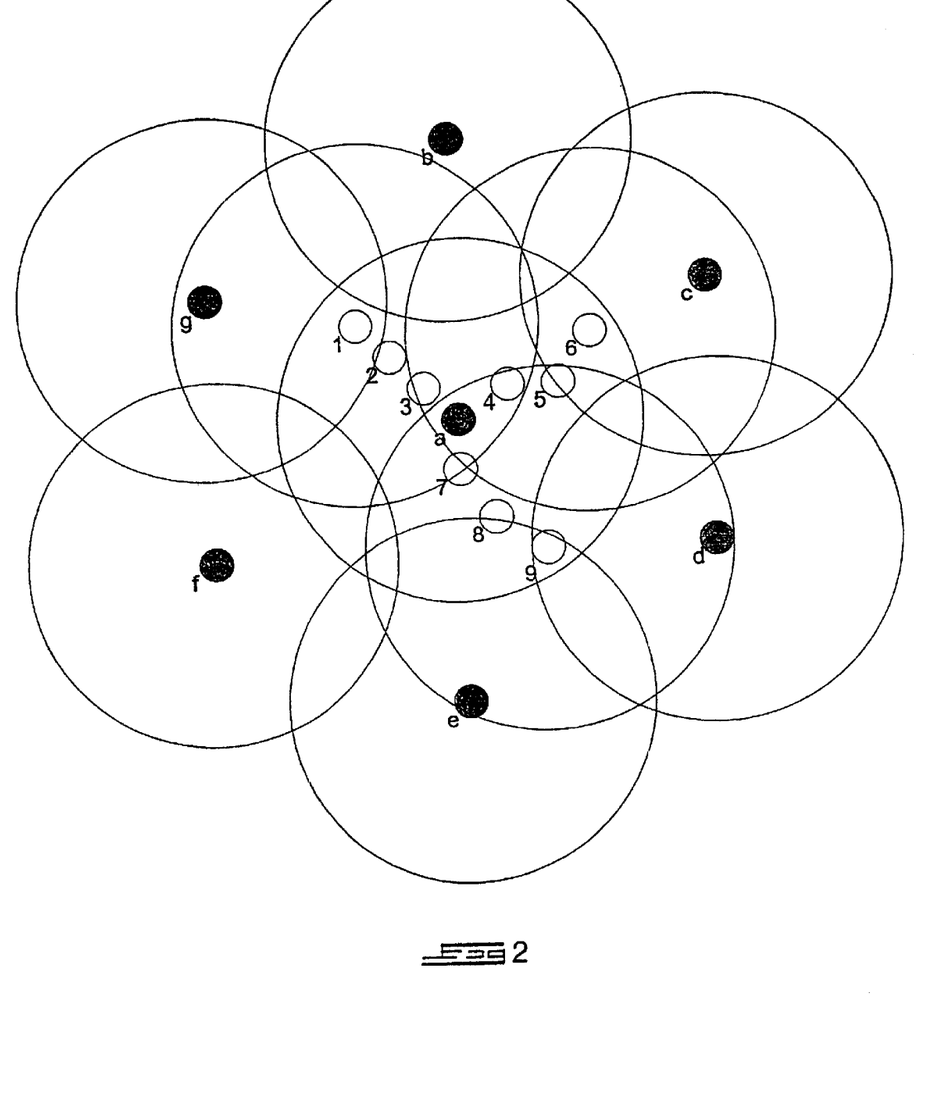
FIG. 2 is a more detailed schematic diagram showing several base stations and mobile stations of a conventional cellular network.

FIG. 2 shows a more realistic schematic representation of a conventional cellular network, comprising seven base stations a to g and nine mobile stations 1 to 9. It can be seen that the base stations a to g have overlapping regions of coverage. The overlapping regions limit the resources that a base station can use. The mobile station 9 is seen to be within effective coverage of base stations a, d and e. While the mobile station 9 is communicating with the base station a, it is also interfering with the base stations d and e, thereby limiting the use of the resources at the base stations d and e. It can also be seen that the mobile stations 1 and 6 could not communicate with the base station a using the same resources as the mobile station 9.

Figure 3:
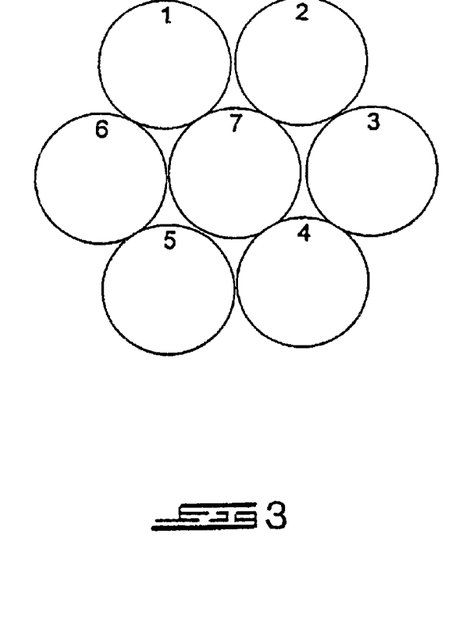
FIG. 3 is a simplified diagram, similar to FIG. 1, showing the cellular coverage of fixed stations in a network according to the invention.

FIG. 3 shows the arrangement of the present invention in a highly simplified manner, where the coverage of adjacent cells is non-overlapping, leaving "dead" zones (i.e. zones of reduced coverage or reduced resource availability) between the cells.

Figure 4:
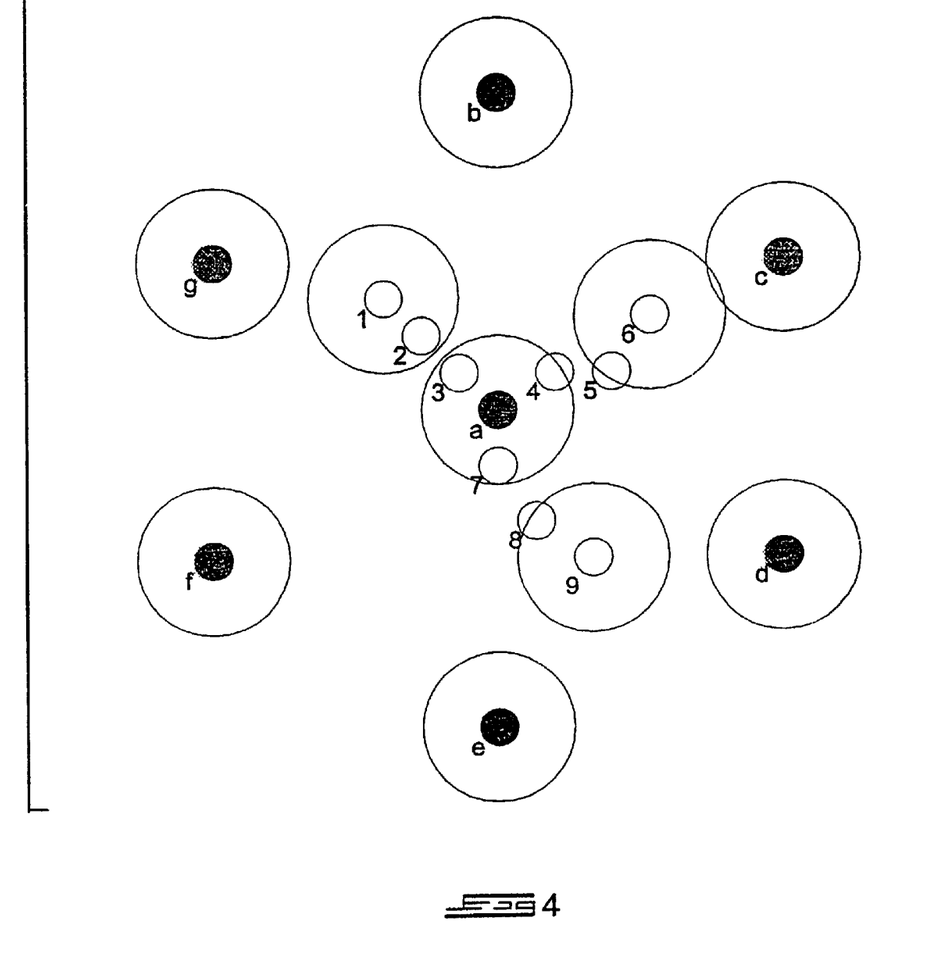
FIG. 4 is a more detailed schematic diagram, showing the effect of the invention as applied to the network of FIG. 2.

FIG. 4 shows the concept of the invention applied to the arrangement of FIG. 2. By reducing the transmission power of each base station (and optionally the mobile stations), the problem of overlapping regions of coverage between the base stations is obviated. Furthermore it can be seen that the mobile stations 1, 6 and 9 and all the base stations can each use the same resources at the same time.

Figure 5:
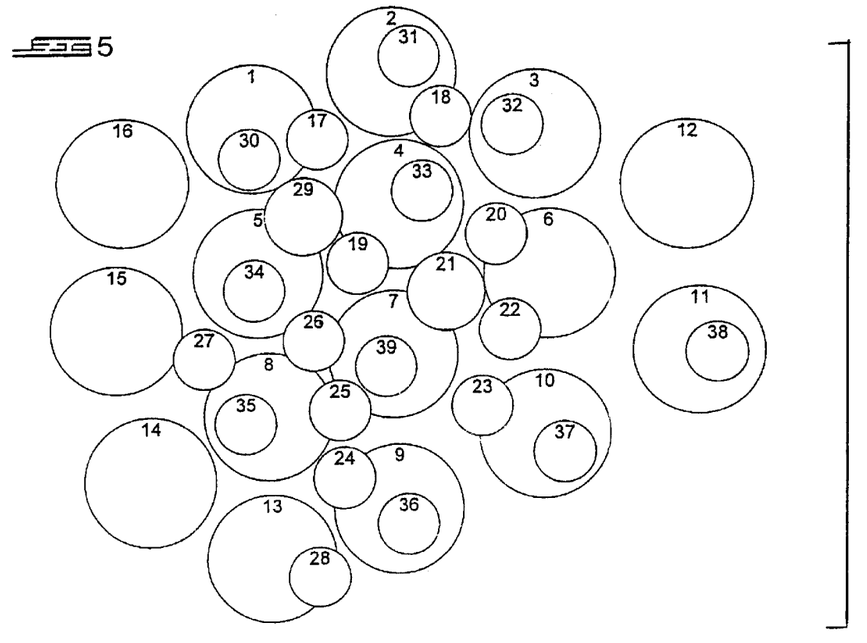
FIGS. 5 and 6 are simplified schematic diagrams illustrating the operation of an embodiment of a cellular network according to the invention.

In FIG. 5, sixteen cells (numbered 1 to 16) are shown which are non-overlapping. These cells corresponds to the area of coverage of respective fixed or base stations. The smaller circles numbered 17 to 29 represent the areas of coverage of typical transmissions by respective mobile stations located in the "dead" zones of reduced resource availability between the cells 1 to 16. The small circles numbered 30 to 39 indicate the areas of coverage of typical transmissions by respective mobile stations within certain of the cells 1 to 16 which are communicating directly to the respective base stations simultaneously. This latter condition is indicated by the overlapping of the circles 30 to 39 with the centres of the relevant cells 1 to 16.

The lack of overlap between the circles 17 to 29 indicates that there is no interference between the areas of coverage represented thereby. Also, since the circles 17 to 29 do not overlap the centres of any of the cells 1 to 16, the mobile relay stations are not interfering with the base stations. Simultaneously, each base station needs to be able to use its own time slot, and this is represented by the circles 30 to 39 indicating data being transmitted during that time slot to each of the base stations. Since the circles 30 to 39 each only overlap the centre of the respective cells 1 to 16 which they are in, the mobile stations represented thereby do not interfere with the base stations of adjacent cells. Also, since the circles 30 to 39 do not overlap the circles 17 to 29, there is no interference with the mobile stations acting as relays. Therefore each base station has used its time slot. On the next transmission data could be sent from each of the relay stations (17 to 29) to the base stations and no loss of time slots would have occurred. This means that 100% usage of all time slots in all cells is possible, while ensuring 100% geographic coverage, with only relatively simple rules having to be implemented to achieve this.

In the case of transmissions into the base station cells, the rule is that a mobile station outside the region of coverage of the cell must transmit data to a relay station in such a fashion as not to interfere with the base station and to ensure that its transmission is below the noise floor of the base station, whilst at the same time having a sufficient signal to noise ratio to reach a mobile station within the coverage area of the base station. A further rule is that the mobile station which is using a particular time slot to send data to the base station should not interfere with the mobile station receiving the data and acting as a relay on behalf of the mobile station outside the coverage area of the base station.

Since there is no overlap between the various small circles there is no interference between these stations. There are therefore two types of transmission going on simultaneously:

1. Mobile stations (17–29) outside of cell coverage relaying to mobile stations within cells.
2. Mobile stations (30–39) inside of cell coverage communicating directly to cell base stations.

The above assumes that the mobile stations (30–39) have data to send for themselves, or data that they have received in a previous time slot from stations outside of the cell coverage.

The effect of lack of interference between the various transmissions is shown by the small circles in FIG. 5, and it is evident that for any mobile station acting as a relay it should always be possible to find a mobile station within a cell to use the time slot and send data to the base station in such a way so as not to interfere with the relayer and for the relayer not to interfere with the base station.

The effect of two simultaneous transmissions occurring in a single cell on the same frequency, in the same time slot, is shown by two non-overlapping circles in each of the cells. Needless to say, in the case of each transmission hop, two smaller hops could be made to ensure that less area is covered (or more excluded) during those transmissions, but the basic principle is sufficiently shown.

Opportunistic hopping allows 100% use of all time slot resources at each base station, and if multiple frequencies or codes were available, these also could be used 100%. Through simplistic opportunistic hopping techniques, 100% of the available resources at each base station can be utilized without the significant timing and frequency synchronisation that is typical of a conventional cellular structure, where at best only a fraction of the total resources are available to each base station.

Such an effect is impossible in a cell structure that does not use subscriber relay. If a real geographic coverage plan is used the problem is significantly worsened, and if shadowing and fading and noise effects are taken into account, the use of conventional cellular techniques limits frequency re-use or time slot re-use in adjacent cells, requiring a frequency planning scheme. This will result in a further reduction in the resources available at each base station.

The basic procedure required to implement a practical system according to the present invention is simple and can be summarized as follows:

For inbound transmissions (i.e. messages flowing from mobile stations outside the cell coverage area to a base station):

1. A mobile station outside a cell in the "dead" region between adjacent cells needs to transmit its data to a mobile station inside one of the cells.

2. It does this by opportunistically choosing one of the three adjacent cells (or more in more complex arenas), and then sending data to that cell by sending it to one of the mobile stations in the cell.

3. This is done opportunistically, based upon sending the data to an opportunistically chosen mobile station that is not being interfered with by a transmission from another mobile station sending data to the base station within the cell.

4. The transmission is made by the mobile station outside the coverage area to a mobile station within the coverage area in such a way as not to interfere with the base station. This is shown schematically in FIG. 5, where transmissions occur at the same frequency within the same cell without interfering with each other, with at least two transmissions occurring simultaneously per cell on the same time slot, on the same frequency allocation or code allocation.

5. In the next time slot available the mobile station within the cell coverage area will send the data it has received to the base station.

6. Simultaneously, in the next time slot available, other stations outside of the coverage area can send their data to mobile stations inside the coverage area.

7. The above procedure can follow an opportunistic bucket brigade cycle with data continuously being provided in every time slot to the base station with no interference, thereby ensuring 100% use of the base station.

For outbound transmissions (i.e. messages flowing from the base station to mobile stations outside the cell coverage area):

1. The fixed network needs to send data to a mobile station outside the cell coverage area.

2. The network opportunistically chooses one of the three adjacent cells that are nearby to the subscriber (or more in more complex arenas).

3. This is done opportunistically, based upon sending the data to a base station that is not busy.

Figure 6:
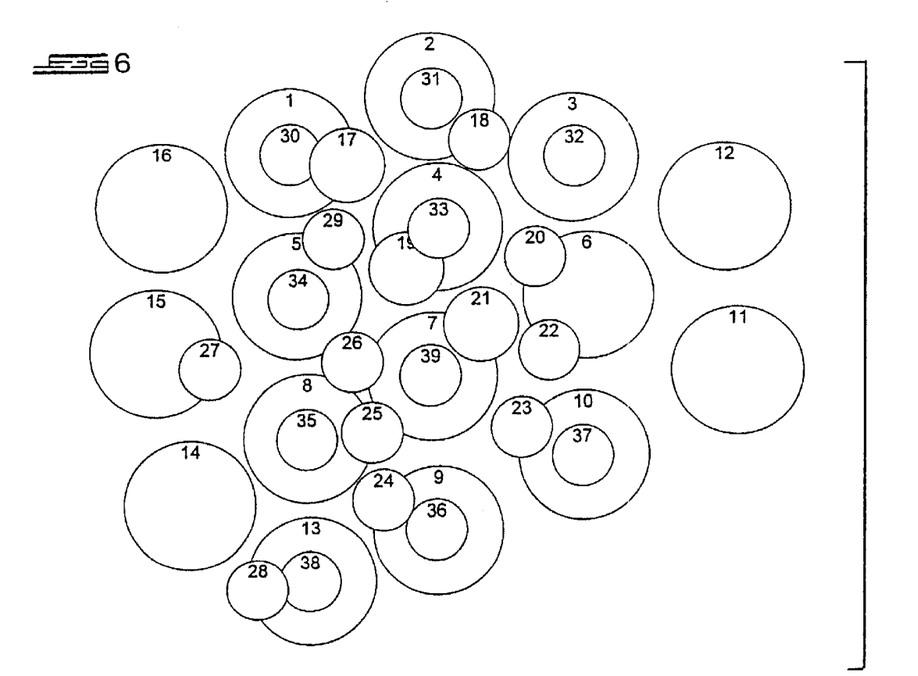

4. The base station then transmits the data to an opportunistically chosen mobile station (30–39) within its coverage area that is able to transmit the data on a subsequent time slot to the mobile station outside the coverage area. Simultaneously, mobile stations (30–39) that have received data on previous transmissions are sending data to mobile stations (17–29) outside the cell coverage area.

5. This is shown schematically in FIG. 6, where transmissions occur at the same frequency within the same cell without interfering with each other, with at least two transmissions occurring simultaneously per cell on the same time slot, on the same frequency allocation or code allocation.

6. In the next time slot available the mobile station within the cell coverage area will send the data it has received to the mobile station outside the cell coverage area.

7. Simultaneously, in the next time slot, the base station can send data to another mobile station acting as a relay or directly to a mobile station within the cell coverage area.

8. The above procedure can follow an opportunistic bucket brigade cycle with data continuously being provided in every time slot from the base station with no interference to the base station by the mobile stations in the cell acting as relays, thereby ensuring 100% use of the base station.

The basic method involves at least two simultaneous transmissions in each cell in each time slot:

1. The base station sends data directly to mobile stations within the cell coverage area (FIG. 6) or to opportunistically selected relays within the cell coverage area which can then forward the data to stations outside the coverage area.

2. Simultaneously relays transmit data to mobile stations outside the cell coverage area so as not to interfere with the intended recipient of the simultaneous transmission by the base station within the same cell or any adjacent cell.

A simple simulation technique can extend this from a single time slot/frequency slot resource management to multiple time slots, or multiple code slots or multiple frequencies, with the same effect holding true with the same rules being utilized.

Needless to say in a mobile telephone network the traffic flow is two way and the outbound and inbound rules will be combined and work in tandem to best make use of the resources available at the base stations.

Figure 7A:
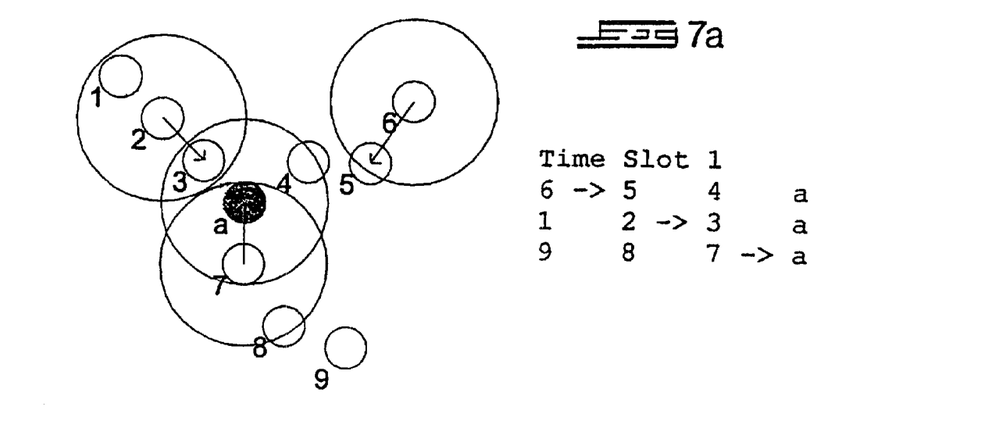
FIGS. 7a to 7c are diagrams illustrating time slot utilisation in an embodiment of a cellular network of the invention.
Figure 7B:
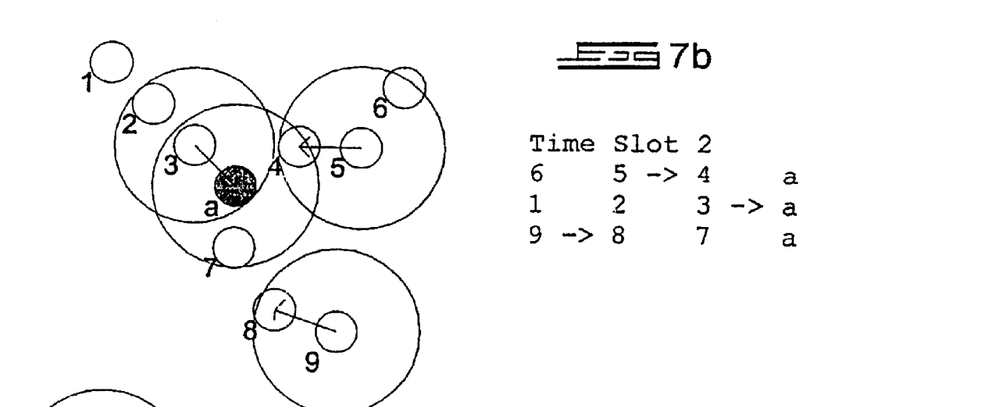
Figure 7C:
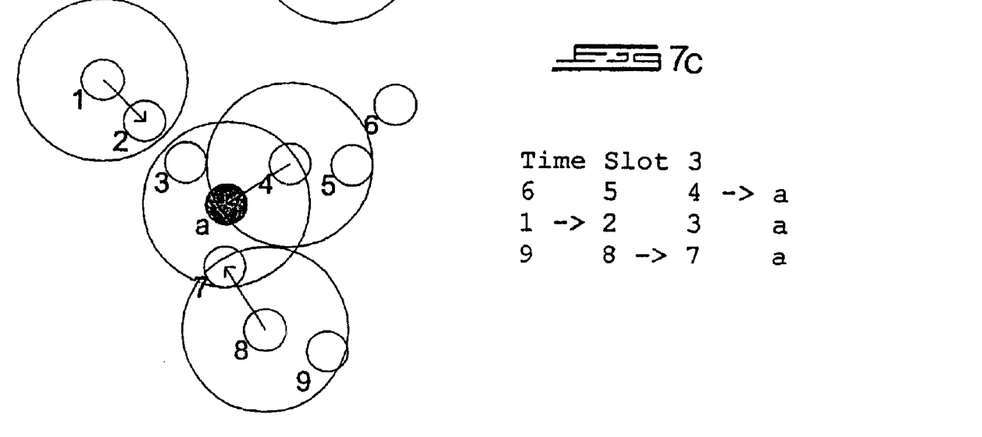

FIG. 7 shows how the outlying mobile stations in the network of FIG. 4 would communicate with the base station a by relaying via other mobile stations. It also shows how three mobile stations in each time slot can use the same resource. Furthermore it can be seen that the base station a is using the same resource in every time slot, thereby making 100% use of the resources at the base station. This figure shows data moving towards a base station, i.e. the mobile station 1 sends its data to the mobile station 2 during the first time slot. During the next time slot the mobile station 2 forwards the data to the mobile station 3. During the third time slot the mobile station 3 forwards the data to the base station. For data moving in the other direction the order of the sequence would be reversed.

The system adapts its power up or down as the number of mobile stations decreases or increases. In addition, higher efficiency modulation that requires a higher carrier to interference ratio but makes better use of the resources available can be used, which will further improve the capacity of the base stations measured in erlangs/cell/Hz. When there are a limited number of mobile stations in an area the base stations and mobile stations would use more power. This would increase the coverage of each station and reduce the number of resources available at each base station. However the base stations do not need all the resources when there are only a few mobile stations.

When more mobile stations move into an area, the mobile stations and base stations drop their power. Also, as mentioned above, higher efficiency modulation can be used. This would reduce the coverage of each station and increase the number of resources available at each base station. The higher efficiency modulation will make more effective use of the resources, thereby increasing the effective capacity available. The system is thus self-adapting to the number of mobile stations.

It can be seen that as the number of mobile stations increases so would the number of hops increase required to reach a base station. It can also be seen that new data can be sent from the mobile station every third time slot. This means that in a long chain of hops there may be more than one packet in the chain at any given moment in time. This creates a bucket brigade effect. However the time it takes for any particular data packet to reach the base station is a direct function of the number of hops.

In a conventional GSM cellular system a mobile station only communicates with the base station in every $8^{th}$ time slot. This means that a system based on an existing GSM cellular system would allow 8 hops and still allow a mobile station to communicate with the base station with same amount of total time delay. However more hops could be used if increasing the total time delay is not a problem.

In a conventional GSM system there is a random access channel that is used to indicate the presence of mobile stations to the base station and to set up time slots for a call. This same random access channel would be used to set up the calls over multiple hops.

If a mobile station can communicate directly with a base station it will send the base station a list of all the mobile stations it can hear on the random access channel and the power levels at which it hears the mobile stations. The base station will then be able to determine which mobile stations it can hear directly and which mobile stations it can reach indirectly by relaying through a mobile station. Because the base stations and mobile stations reduce their power as the number of mobile stations increase, the random access channel would not become overcrowded. Thus, in the same way that a particular resource can be used at the same time by different stations, so can the random access channel.

When a mobile station sends its list to the base station other mobile stations will hear it send the list. They will then know that this particular mobile station has contact with the base station. Mobile stations that cannot directly communicate with a base station would then send their lists of mobile stations they can hear to the mobile station that can communicate with the base station. In turn mobile stations that hear these mobile stations can send their lists to these intermediate mobile stations, and so on.

The base station will then be able to collect all this connectivity data and be able to determine which mobile stations can hear which other mobile stations. The base station will then adapt its own power based on the number of mobile stations it wants to reach directly. It will also send messages back to the mobile stations to tell them how much power to use.

Therefore the base station will control its own power level and the power level of the mobile stations in its area. In addition, the base station can control the level of modulation efficiency and the associated required carrier to interference ratio used by itself and the mobile stations in its area.

Since the base station now has a list of all the mobile stations in its area and knows the connectivity of each mobile station it can now allocate resources to any mobile stations when a call is made. It can also change the resource allocation for a mobile station that is midway in a call. This would be necessary if two mobile stations using the same resource move closer together during a call, for example.

If a mobile station hears two different mobile stations that can communicate with two different base stations it will send lists to both base stations via these mobile stations. Therefore mobile stations in outlying areas would show up in the lists of more than one base station. This will allow the base stations to hand off a mobile station from one base station to another during a call.

If a mobile station hears no other mobile stations or base stations it will automatically increase its power until a mobile station or base station responds. This will allow a new mobile station to enter the network if it is in an outlying area. As soon as the mobile station becomes part of the network the base station will start to control the power and resources of the mobile station.

The co-ordination of the mobile stations would require a computer at each base station. However taking into consideration that mobile stations in a cellular network normally do not move very fast and that not all mobile stations are in call at any given moment in time, the computer should easily be able to handle the allocation of the resources. By placing the base station in charge of the resources in its area and the power levels of the mobile stations in its area, the mobile stations themselves would not require any complicated hardware or software. This reduces the complexity and cost of the mobile stations.

Since each base station is in control of the resources and power levels of all the mobile stations in its zone of coverage it can decide on the number of hops that a mobile station will use by adjusting its power level. Therefore a base station can decrease the power used by a mobile station by increasing the number of hops between the mobile station and the base station. This will increase the battery life of a mobile station. Furthermore the mobile stations could also indicate their battery level to a base station. The base station could then elect not to route messages via a mobile station with limited battery resources, but rather route via mobile stations that are plugged into mains chargers, vehicle car kits etc.

Figure 8A:
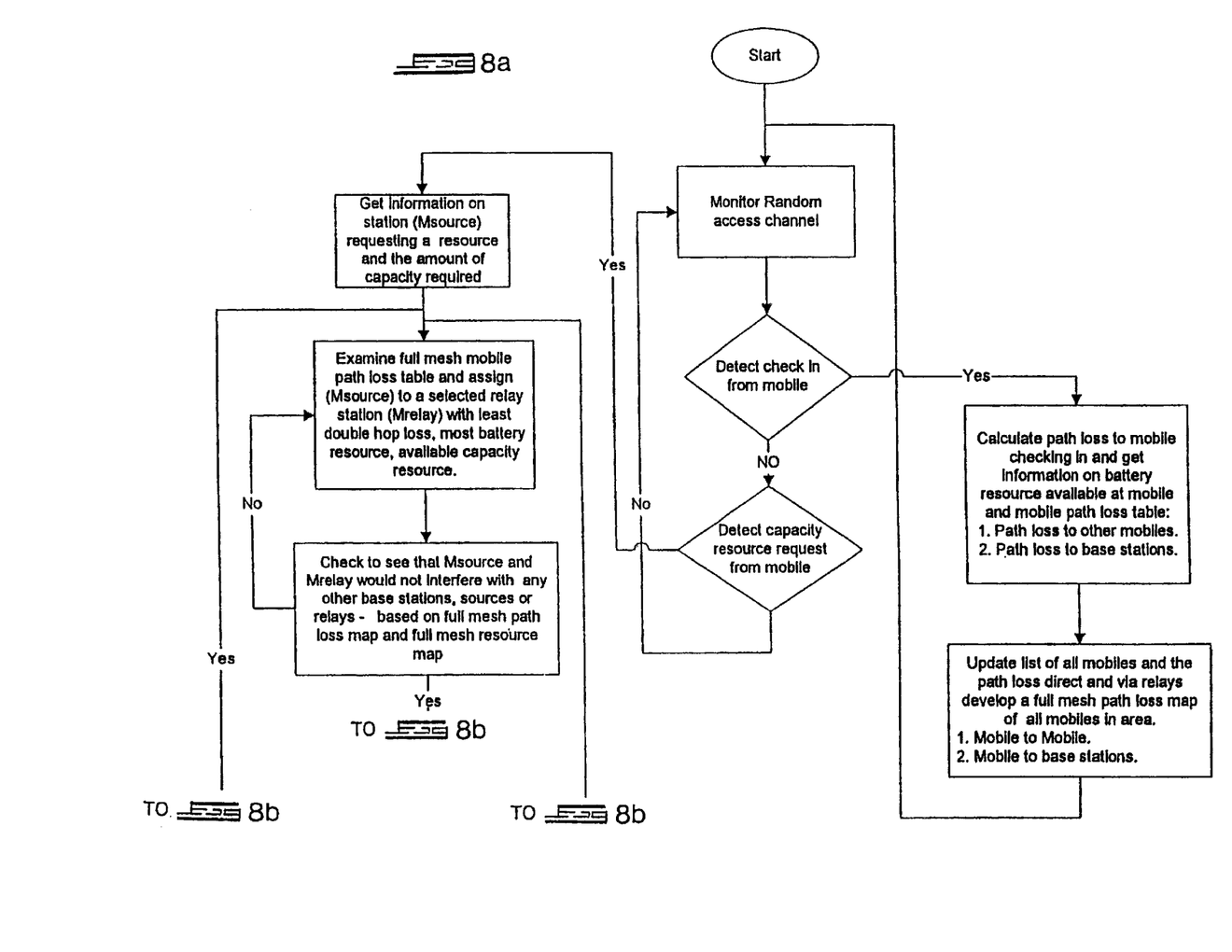
FIG. 8 is a flow chart illustrating the operation of an embodiment of the invention.
Figure 8B:
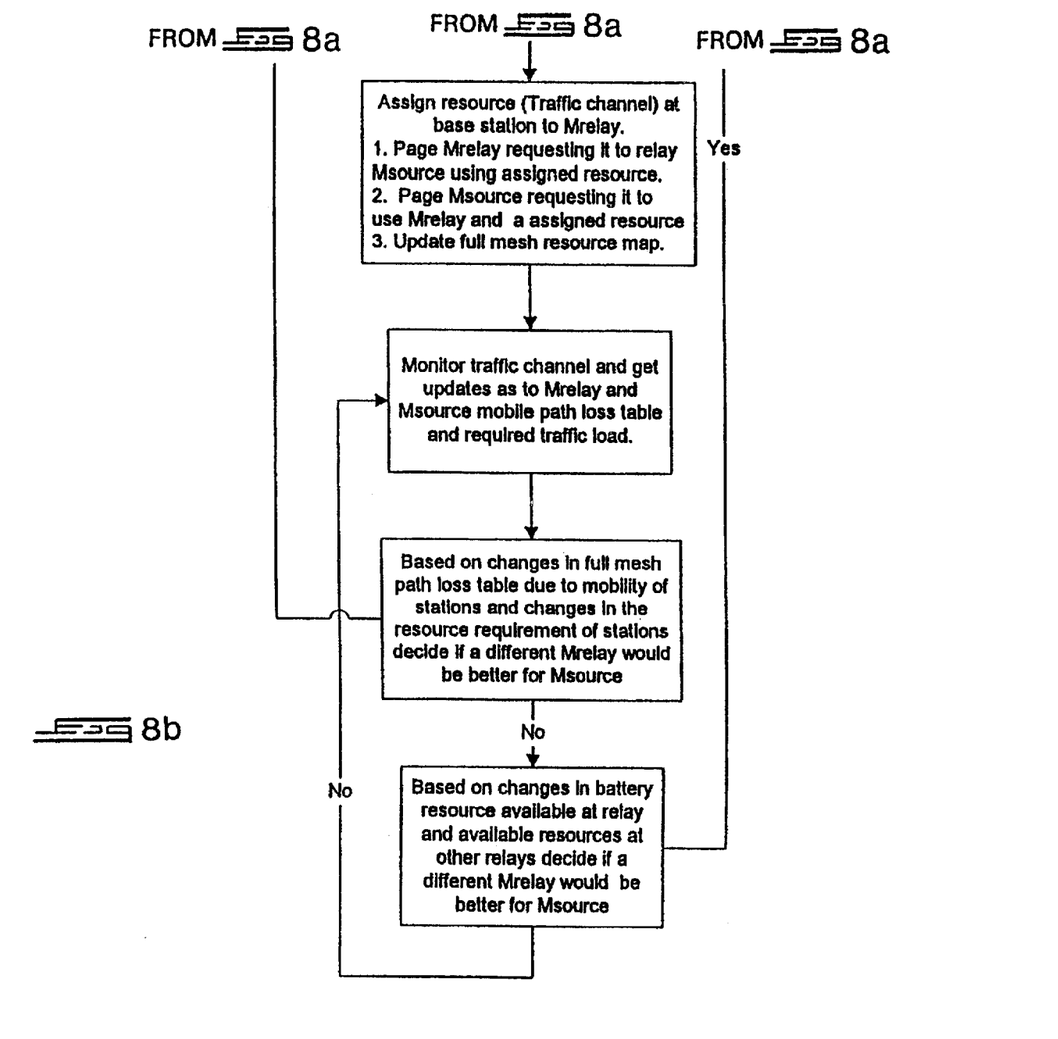

A flow chart of a suitable algorithm for controlling the base station is shown in FIG. 8. The base stations continually monitor a random access channel on which the mobile stations will check-in regularly, reporting their status. When mobile stations report their status they will provide a mobile station path loss table to the base station they are checking in to. In addition the mobile stations will report their battery status. The mobile station path loss table will gives the path loss from the mobile station to all the other stations it can hear. The individual mobile stations monitor the random access channel and thus monitor the checking in of other mobile stations into the base stations in order to derive this information.

Each base station transmits on a separate paging channel a broadcast page that informs mobile stations in the area of its existence and gives them information such as the number of mobile stations in the coverage area of the base station and the amount of the resources available at the base station. All base stations can share the same paging channel and therefore some sharing of this resource is required to avoid collision in the reception of mobile stations in the region of overlapping cells. However the paging channel only transmits a small amount of information and therefore only takes a small amount of the resources available at the base stations. The broadcast page, since it has only a low effective data rate, can be heavily coded if necessary and can be transmitted at sufficiently high power to cover the whole cell. Therefore all mobile stations will hear the broadcast pages of at least one base station and potentially multiple base stations.

When mobile stations check-in to base stations they can use the information derived from the broadcast pages of the base stations to set their transmission power sufficiently high to reach the base stations. This open loop power control will help to minimize interference into other base stations. The mobile stations checking in from within the "dead zones" interference-suspectable zones between base stations will obviously interfere with one or more base stations. However the resource allocated to the paging channel is small and the transmissions short, reducing the potential of interference between the transmissions of any two mobile stations. The power required to transmit the check-in messages can be reduced since the information content is low. Therefore mobile stations throughout the coverage zone of a cell can check-in to the base station.

The regular check-in transmissions made by mobile stations allow the various base stations to develop a full mesh path loss table that gives the path loss between all mobile stations in the coverage of its broadcast pages. In addition the path loss from each mobile station to all the base stations it can detect is also derived at the base stations. The base station identifies which mobile stations can directly send traffic into a base station and the maximum data rate at which this can be achieved based on the transmit power available at the mobile station. The base station also identifies which stations are in an "interference zone", where if they transmitted in to a base station they would interfere with another base station. The base stations then uses the fill mesh path loss table to identify relay routes for the mobile stations that are in the interference zone.

When as shown in FIG. 8 a mobile station wants to send traffic to a base station it will make a capacity resource request to one of the base stations around it. The mobile station will choose the best base station based on broadcast information sent by the base stations.

The base station will then decide if, based on the resource requested, the mobile station should access it directly or transmit via a relay. In the latter case, the base station will send a page directly to the relay identified and to the mobile station making the request, telling them which resources to use taking into account the resource map of traffic in the cell and the resources used in adjacent cells. The adjacent cell information can be passed between base stations or could be derived from the check-in of mobile stations within the cell, since it is only the resources used by mobile stations that are within range that are relevant.

The base station can then either instruct the mobile stations as to the maximum power they can transmit at, or set a criterion that they cannot transmit so as to interfere with another station that is using the same resource. For example, the base stations could allocate resources in a time-slotted arrangement as shown in FIGS. 7a to 7c.

As stations move the base stations could continually reallocate resources and change the relays used as shown in FIG. 8. The above concept could be easily modified to multi-hop relaying where more than one relay could be paged and allocated resources to relay data from a mobile station.

Two-way data flow is handled in exactly the same way as described above, with resources being allocated for data flowing from the base station to the mobile station and vice versa.

In the case of a traffic call initiated from within a conventional fixed network to a mobile station, an appropriate base station will be chosen by the network based on the full mesh path loss and resource tables. The destination mobile station and the required relays are then paged by the chosen base station and allocated resources, and instructed to prepare to receive traffic from the network. The rest of the methodology is identical to that described above and illustrated in FIG. 8.

Although the described cellular system has been described with reference to mobile stations relaying data transmissions to destination base stations, mobile stations could also route messages on a full mesh basis from any mobile station to any other mobile station. By relaying from mobile station to mobile station around the areas of coverage of base stations within the "dead zone" in such a way as not to interfere with the base stations, the base station resources are effectively reused. Even a mobile station within the zone of coverage of a base station could transmit to a mobile station outside the zone of coverage in such a way as not to interfere with the base station.

The message could then be relayed via multiple mobile stations in the "dead zone" thereby reusing the base station resources without reducing the capacity at the base station.

This method could be used to reduce the load on the base stations by effectively relaying the mobile-to-mobile traffic around the base stations without using any base station resources. As more and more mobile stations enter the network, more relaying can occur to route traffic from mobile station to mobile station across the network thereby further reducing the load on the base stations.

If there are only a few mobile stations in a network and relay mobile stations are not available, mobile stations can send message traffic to a base station, and then via the fixed network to another base station if necessary, and then to the destination mobile station. Since the network is sparse, the base station resources will only have to be shared between a few mobile stations and therefore the required capacity is self scaling.

In a network with high mobile station density the only messages being sent via base stations will be those being sent to or from mobile stations to the fixed network (conventional wireline users) or to distant mobile stations where relaying via mobile stations would result in too much delay or where relays are not available.

What is claimed is:

1. A method of transmitting data between stations in a cellular wireless communication system comprising a plurality of mobile stations and a plurality of base stations, the method comprising locating a plurality of base stations so that each base station has a zone of effective coverage which does not overlap with the zones of effective coverage of adjacent base stations, thereby defining zones of reduced coverage between the base stations, and relaying a data message from a sender station to a destination station via at least one relay station, wherein at least one of the sender station and the destination station is a base station, and wherein the other of said sender station and said destination station is a mobile station located within a zone of reduced coverage with respect to said base station, so that transmission of the data message from the sender station to the destination station does not interfere with adjacent base stations.

2. A method according to claim 1 wherein the destination station is a base station and the sender station is a mobile station located within a zone of reduced coverage with respect to said base station.

3. A method according to claim 2 wherein said at least one relay station is located within the zone of effective coverage of the destination base station.

4. A method according to claim 3 wherein the data message from the sender station is relayed by at least one further relay station located in a zone of reduced coverage with respect to said destination base station.

5. A method according to claim 4 wherein the zones of reduced coverage with respect to each base station are zones in which at least one resource utilized by the base station is reduced.

6. A method according to claim 5 wherein the resources include transmission power, transmission time slots, frequency channels, modulation efficiency and codes.

7. A method according to claim 6 wherein the resources are reduced due to sharing thereof between two or more base stations in respective overlapping zones of reduced coverage of the base stations.

8. A method according to claim 7 wherein the relay stations adjust their transmission power, when relaying messages to a base station or mobile station in the zone of effective coverage of a base station, to avoid interference with said base station.

9. A method according to claim 8 wherein the relay station adjust their usage of at least one of their transmission time slots, frequency channels, modulation efficiency and codes to avoid interference with said base station.

10. A method according to claim 9 wherein the relay stations monitor data transmissions to and from base stations and/or between other mobile stations, and relay messages opportunistically when said data transmissions are not occurring, thereby sharing resources with other stations.

11. A method according to claim 9 wherein the relay stations monitor data transmissions to and from base stations and/or between other mobile stations, and relay messages at sufficiently low power level to avoid interference with said data transmissions.

12. A method according to claim 11 wherein the relay stations monitor data transmission to and from base stations and/or between other mobile stations and relay messages opportunistically, utilizing higher efficiency modulation, when an increased signal to interference ratio is available, to avoid interference with said data transmissions.

13. A cellular wireless communication system comprising a plurality of mobile stations and a plurality of base stations, each mobile station being able to transmit data to and receive data from other stations and to act as relay stations, the base stations being located so that each base station has a zone of effective coverage which does not overlap with the zones of effective coverage of adjacent base stations, thereby defining zones of reduced coverage between the base stations, the system being adapted to relay data messages from a sender station to a destination station via at least one relay station, wherein at least one of the sender station and the destination station is a base station, and wherein the other of said sender station and said destination station is a mobile station located within a zone of reduced coverage with respect to said base station so that transmission of the data message from the sender station to the destination station does not interfere with adjacent base stations.

14. A communication system according to claim 13 wherein the zones of reduced coverage with respect to each base station are zones in which at least one resource utilized by the base station is reduced.

15. A communication system according to claim 14 wherein the resources include transmission power, transmission time slots, frequency channels, modulation efficiency and codes.

16. A communication system according to claim 15 wherein the resources are reduced due to sharing thereof between two or more base stations in respective overlapping zones of reduced coverage of the base stations.

17. A communication system according to claim 16 wherein the mobile stations are adapted to adjust their transmission power, when relating messages to a base station in the zone of effective coverage of a base station, to avoid interference with said base station.

18. A communication system according to claim 17 wherein the mobile stations are further adapted to adjust their usage of at least one of their transmission time slots, frequency channels, modulation efficiency and codes to avoid interference with said base station.

19. A communication system according to claim 18 wherein the mobile stations are adapted to monitor data transmissions to and from base stations and/or between other mobile stations, and to relay messages opportunistically when said data transmissions are not occurring, thereby to share resources with other stations.

20. A communication system according to claim 19 wherein the mobile stations are adapted to monitor data transmissions to and from base stations and/or between other mobile stations, and to relay messages at a sufficiently low power level to avoid interference with said data transmission.

21. A communication system according to claim 19 wherein the mobile stations are adapted to monitor data transmission to and from base stations and/or between other mobile stations and to relay messages opportunistically, utilizing higher efficiency modulation, when an increased signal to interference ratio is available, to avoid interference with said data transmissions.

* * * * *